(12) United States Patent
Green et al.

(10) Patent No.: US 10,219,450 B2
(45) Date of Patent: Mar. 5, 2019

(54) CUTTING TOOTH FOR STUMP CUTTING APPARATUS

(71) Applicant: Green Manufacturing, Inc., Morenci, MI (US)

(72) Inventors: Kevin J. Green, Blissfield, MI (US); Brian P. Holly, Onsted, MI (US)

(73) Assignee: Green Manufacturing, Inc., Morenci, MI (US)

( * ) Notice: Subject to any disclaimer, the term of this patent is extended or adjusted under 35 U.S.C. 154(b) by 120 days.

(21) Appl. No.: 15/034,236

(22) PCT Filed: Nov. 26, 2014

(86) PCT No.: PCT/US2014/067592
§ 371 (c)(1),
(2) Date: May 4, 2016

(87) PCT Pub. No.: WO2015/081185
PCT Pub. Date: Jun. 4, 2015

(65) Prior Publication Data
US 2016/0270307 A1    Sep. 22, 2016

Related U.S. Application Data

(60) Provisional application No. 61/908,988, filed on Nov. 26, 2013.

(51) Int. Cl.
*A01G 23/06* (2006.01)
*B23C 5/20* (2006.01)

(52) U.S. Cl.
CPC ............ *A01G 23/067* (2013.01); *B23C 5/207* (2013.01); *B23C 2200/045* (2013.01); *B23C 2200/161* (2013.01); *B23C 2200/286* (2013.01)

(58) Field of Classification Search
CPC ........ A01G 23/06; A01G 23/067; B23C 5/20; B23C 5/205; B23C 5/207; B23C 2200/045; B23C 2200/161; B23C 2200/283; B23C 2200/286; B27G 13/10
See application file for complete search history.

(56) References Cited

U.S. PATENT DOCUMENTS

| | | | |
|---|---|---|---|
| 5,135,035 A | 8/1992 | Mills | |
| 5,645,323 A | 7/1997 | Beach | |
| 5,743,314 A | 4/1998 | Puch | |
| 6,164,878 A * | 12/2000 | Satran | B23C 5/2221 407/102 |

(Continued)

FOREIGN PATENT DOCUMENTS

| | | |
|---|---|---|
| EP | 2659768 A1 | 11/2013 |
| EP | 2727673 A1 | 5/2014 |

(Continued)

*Primary Examiner* — Matthew G Katcoff
(74) *Attorney, Agent, or Firm* — Endurance Law Group PLC

(57) ABSTRACT

A stump cutter bit for use with a stump cutting apparatus of the type utilizing a cutting wheel or drum rotated about a rotational axis wherein the cutting tool is attached to the cutting wheel or drum. The cutting tool supports the stump cutter bit. The cutting bit having a front face including a plurality of surfaces including an outer surface, an inner surface, and in intermediate surface located between the outer and inner surface.

20 Claims, 11 Drawing Sheets

(56) References Cited

U.S. PATENT DOCUMENTS

| | | | |
|---|---|---|---|
| 6,213,931 | B1 | 4/2001 | Twardowski et al. |
| 7,418,986 | B2 | 9/2008 | Watts |
| 7,484,541 | B2* | 2/2009 | Green .................. A01G 23/067 |
| | | | 144/24.12 |
| 8,020,591 | B2 | 9/2011 | Kappel et al. |
| 8,573,903 | B2* | 11/2013 | Morrison .............. B23C 5/2213 |
| | | | 407/100 |
| 8,672,001 | B2* | 3/2014 | Leonardi .............. A01G 23/067 |
| | | | 144/176 |
| 9,186,733 | B2* | 11/2015 | Riviere .................. B23C 5/109 |
| 2012/0070240 | A1 | 3/2012 | Ishi et al. |
| 2016/0067797 | A1* | 3/2016 | Deguchi ................. B23C 5/109 |
| | | | 409/131 |

FOREIGN PATENT DOCUMENTS

| | | |
|---|---|---|
| EP | 2832477 | 11/2015 |
| WO | 2013002341 A1 | 1/2013 |
| WO | 2013146211 A1 | 10/2013 |

\* cited by examiner

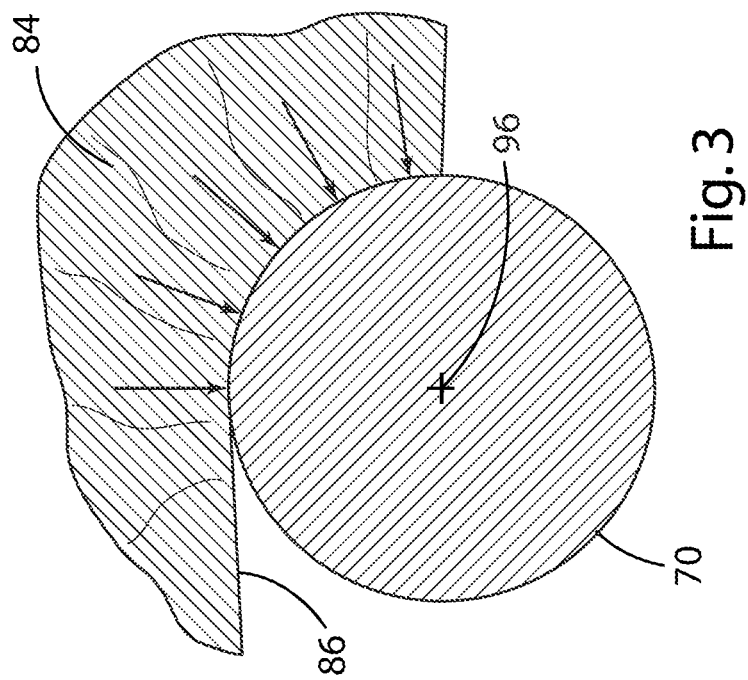
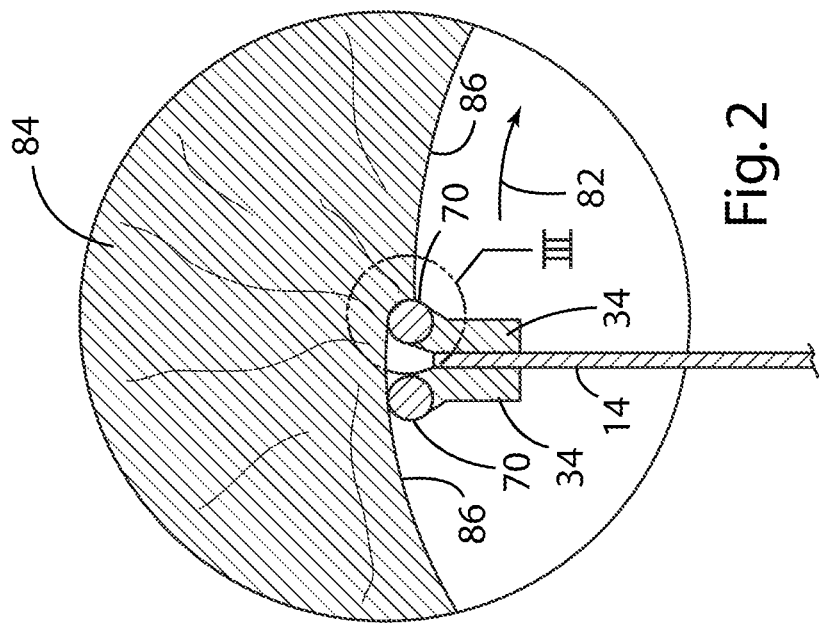

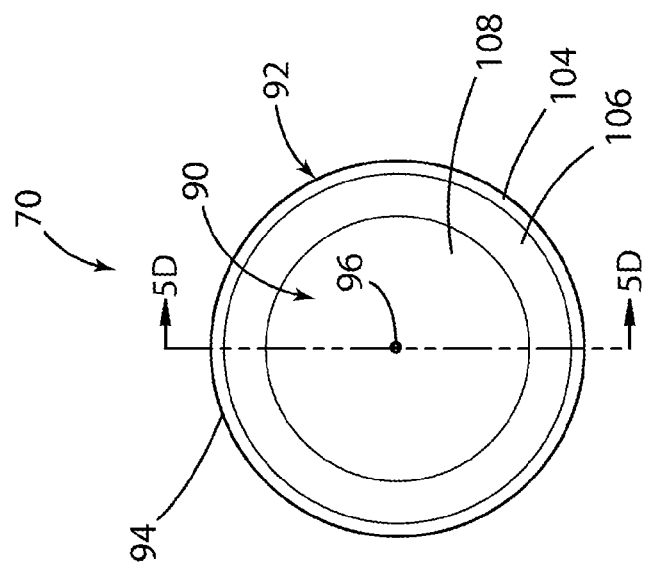
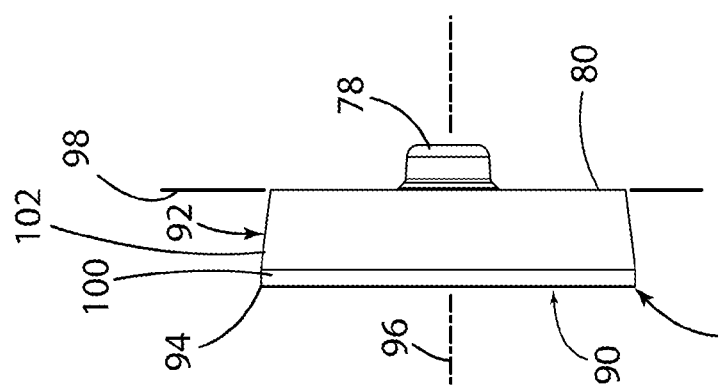
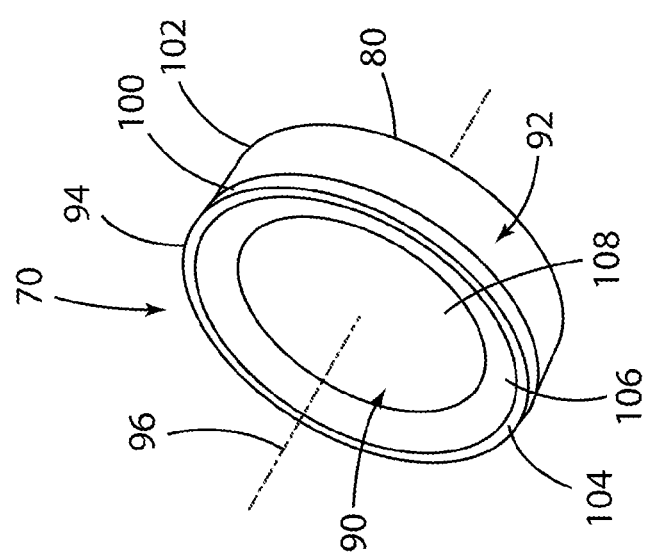

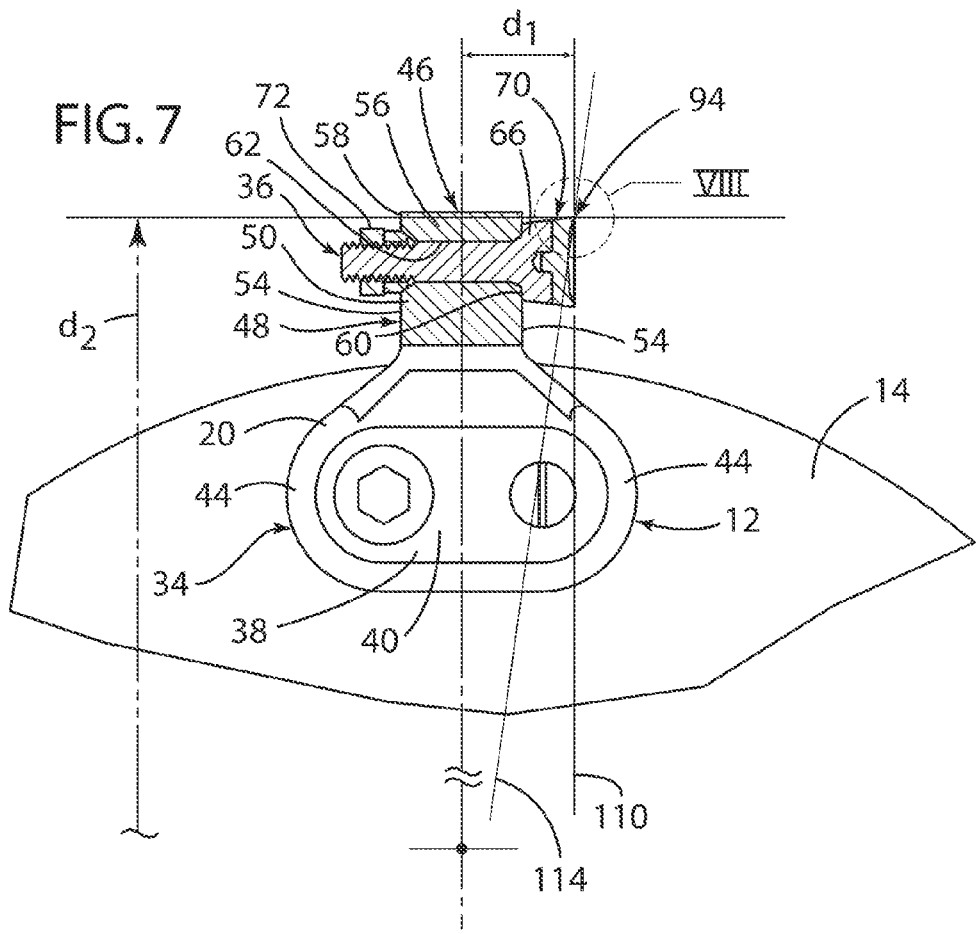

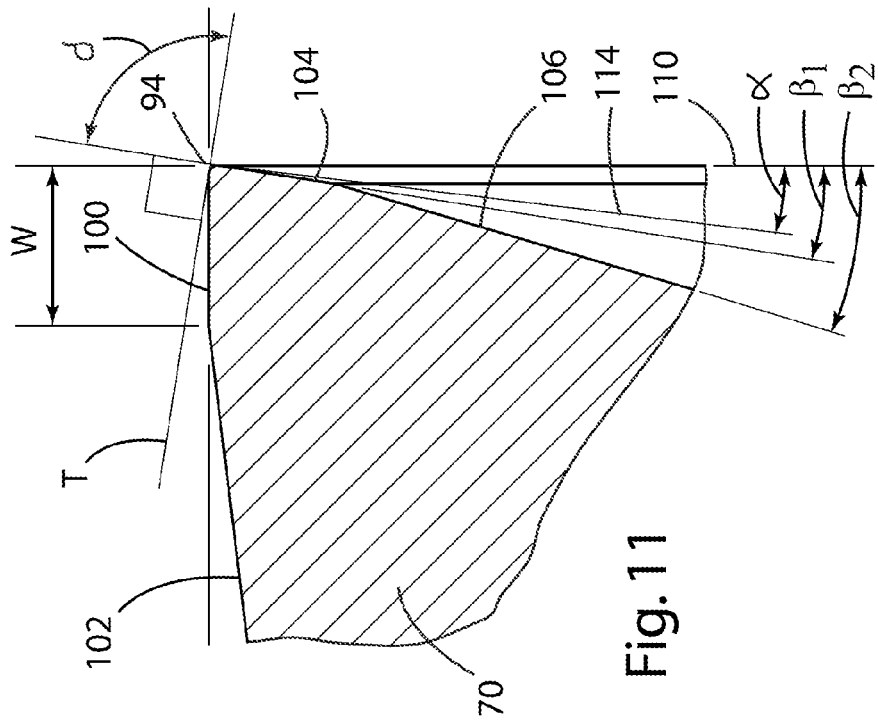
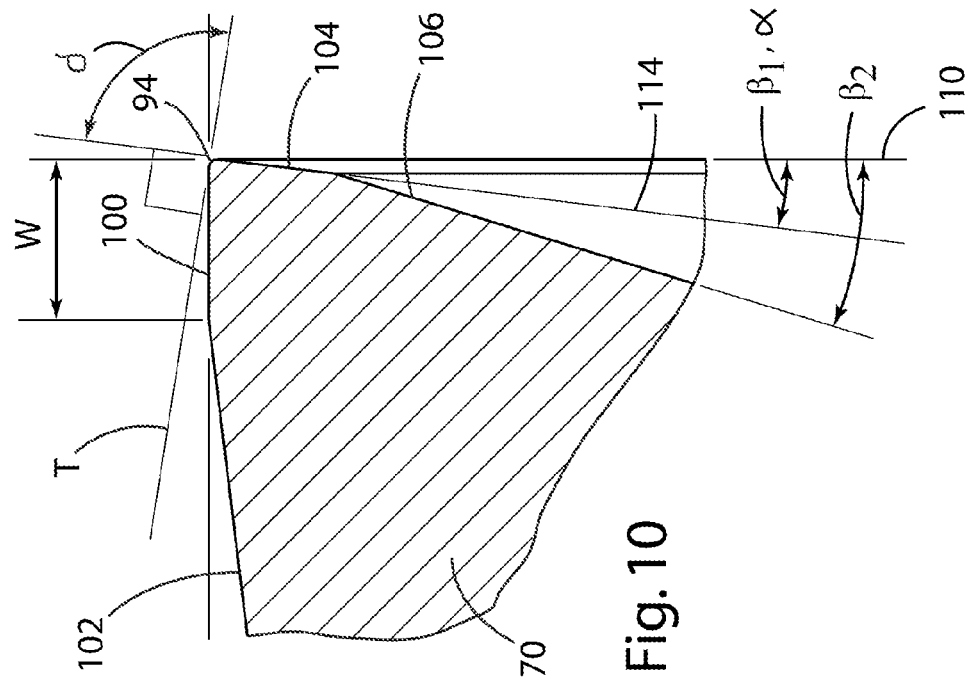

CUTTING TOOTH FOR STUMP CUTTING APPARATUS

CROSS REFERENCE TO RELATED APPLICATIONS

This application claims priority to U.S. Provisional Patent Application No. 61/908,988, filed Nov. 26, 2013, the entire disclosure of which is hereby incorporated by reference and relied upon.

BACKGROUND OF THE INVENTION

Field of the Invention

The invention relates generally to a cutting tooth for use with a stump cutting apparatus; and, more specifically, a cutter bit or tip for a stump cutting tooth.

Description of Related Art

Stump cutters or stump cutting machines are generally known in the art and are used to cut or grind stumps. A typical stump cutter includes a plurality of cutting tools mounted to a rotatable cutting wheel or drum. Placing the wheel or drum against a stump and rotating it causes the cutting tools, and more particularly individual cutting teeth, to engage and cut away the stump. Tool holders, sometimes referred to as pockets, secure the cutting teeth to the cutting wheel.

One type of stump cutting tool assembly includes a cutting tooth and tool holder/pocket assembly. The cutting tooth may include a cutting tip or bit made of a solid material such as tungsten carbide and a generally cylindrical shank that extends through an aperture in a mounting block or pocket. As known, changing each cutting tooth can be expensive. Increasing cutting bit life correspondingly decreases downtime during cutting tool changeover thereby increasing the overall desirability of a cutting tooth.

Furthermore, cutting efficiency has a direct impact on the size of the power source required to operate a stump cutting tool. Reduced efficiency means that a larger, more inefficient engine or motor must be used, thereby increasing purchase cost of the machine, transportation costs to-and-from job sites, and operating costs. Because a stump grinding machine presents an atypical circumstance when compared with most cutting and grinding operations, the typical and obvious steps taken in these other industries to improve cutting efficiency is not generally applicable. Such atypical circumstances include the hard/dense wood with diverse grain patterns encountered in a tree stump, the necessary penetration of earth when grinding portions of the stump below the ground level, and the inevitable encountering of rocks and other buried objects. As such, stump grinding teeth must be extraordinarily robust and tough. They must hold an edge for an extended working life without breakage. Another atypical circumstance relevant to tree stump grinding pertains to the unique motion of a cutting wheel in normal operation. In particular, stump grinding is most often executed by lowering a high-speed spinning cutting wheel into a tree stump, and then laterally swinging the cutter wheel from side-to-side while progressively advancing the blade ever deeper. This unique motion (rotation plus side-to-side) requires many different surfaces of the cutting teeth to ferociously cut into the wood. However, adverse machining vibrations, known generally as chatter, are common when aggressively moving the cutting tool relative to the tree stump. Such chatter produces harsh vibrations that can prematurely damage teeth and bearings, can bend or warp the body of a cutting wheel, and can unduly fatigue the operator. Chatter is therefore preferably avoided or at least minimized. And still yet another atypical aspect of stump grinding is the need, or at least the desire, to produce relatively consistent shredded wood pulp during the cutting operation. Large curls of wood fiber are generally considered not acceptable, as are fine wood dust at the other extreme.

There is therefore a need in the art for improvements in cutting efficiency that accommodate the numerous atypical circumstances of tree stump cutting/grinding, that produce consistent moderately sized wood shavings, and that avoid or at least minimize the occurrence of chatter.

BRIEF SUMMARY OF THE INVENTION

According to one aspect, the present invention relates to a cutting tool supporting a cutting bit for use with a stump cutting apparatus of the type utilizing a cutting wheel or drum rotating about a rotational axis wherein the cutting tool is attached to the cutting wheel or drum. The cutting bit includes a front face, a rear face, and a side surface or face extending between the front face and rear face. In one example, the front face includes an outer surface, an intermediate surface, and an inner surface with the intermediate surface disposed between the outer surface and the inner surface.

In accordance with an additional aspect, cutter bit is generally cylindrical in shape and the outer surface and intermediate surface are both frustoconical.

In accordance with a further aspect of the invention, a stump cutter bit for attachment to a rotatable member having a rotational axis includes: a front face, a rear face, and a side surface extending from the front face to the rear face with an edge formed at an intersection of the side surface and the front face. The front face including an outer surface adjacent the average wherein at least a portion of the outer surface has a rake angle made by the outer surface and a radius extending from the rotational axis through the edge between positive 3° and negative 3°. The front face including an intermediate surface adjacent the outer surface wherein at least a portion of the intermediate surface has a nonnegative rake angle made by the intermediate surface and a radius extending from the rotational axis through the edge. The front face further including an inner surface adjacent the intermediate surface wherein at least a portion of the inner surface has a negative rake angle made by the inner surface and a radius extending from the rotational axis through the edge.

In another aspect of this invention, a low-chatter stump cutter bit is provided of the type mounted to a power-driven cutting wheel and rotated at high speed to grind away an earthen-rooted tree stump. The stump cutter bit includes a cutting tip fixedly supported on a rotationally forward portion of the tooth holder. The cutting tip comprises a body of revolution centered about a longitudinal axis. The cutting tip has a front face configured in use to be scraped across the wooden body of a tree stump generally along, or in the direction of, the longitudinal axis. An annular margin surface is centered about the longitudinal axis and surrounds the front face. An annular cutting edge is formed at an intersection between the margin surface and the front face. The cutting edge establishes a cutting diameter of the cutting tip. The front face includes an outer annular hook surface and an intermediate annular chip-breaking surface. The outer hook surface has a concave frustoconical pitch that extends radially inwardly from the cutting edge. The included angle between the frustoconical hook surface and the frustoconical margin surface is between about 80-89 degrees. The chip-breaking surface has a concave frustoconical pitch that extends radially inwardly from the outer hook surface at a further angle of between about 10-14 degrees.

The unique relationships between the margin surface, hook surface and chip-breaking surface has been found to significantly enhance cutting efficiency while increasing cutter bit toughness and prolonged edge retention. These three surfaces—margin, hook and chip-breaking—function in the atypical context of tree stump grinding, where a high-speed spinning cutting wheel is laterally swung from side-to-side in dense and gnarly wood, to ferociously cut away a wooden stump with minimal chatter. And furthermore, these surface features cooperate to produce relatively consistent shredded wood pulp during the cutting operation.

Still further, a low-chatter stump cutting wheel assembly is provided, of the type rotated at high speed to grind away an earthen-rooted tree stump. The cutter wheel assembly comprises a cutter wheel body configured for power-driven rotation about a rotational axis thereof. A plurality of cutting teeth are attached about the periphery of the cutter wheel body. Each cutting tooth includes a generally circular cutting tip centered about a longitudinal axis. The cutting tip has a front face that in use is configured to be scraped across the wooden body of a tree stump generally along the longitudinal axis. An annular margin surface is centered about the longitudinal axis and surrounds the front face. An annular cutting edge is formed at an intersection between the margin surface and the front face. The cutting edge establishes a cutting diameter of the cutting tip. The front face includes an outer annular hook surface and an intermediate annular chip-breaking surface. The outer hook surface has a concave frustoconical pitch that extends radially inwardly from the cutting edge. The included angle between the frustoconical hook surface and the frustoconical margin surface is between about 80-89 degrees. The chip-breaking surface has a concave frustoconical pitch that extends radially inwardly from the outer hook surface at a further angle of between about 10-14 degrees.

The present stump cutting wheel assembly has been found to improve cutting efficiency in tree stump cutting/grinding operations, while minimizing the occurrence of chatter and producing relatively consistent shredded wood pulp shavings.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE SEVERAL VIEWS OF THE DRAWINGS

These and other features and advantages of the present invention will become more readily appreciated when considered in connection with the following detailed description and appended drawings, wherein:

FIG. 2 is a partial, cross-sectional schematic view taken generally along lines 2-2 of FIG. 1 and depicting the lateral swing path or arc of a stump cutting apparatus.

FIG. 3 is an enlarged view of the area circumscribed at 3 in FIG. 2 showing reactionary force vectors resulting from the lateral cut profile or path of a stump cutting apparatus according to the present invention.

FIG. 5A is a perspective view of a cutting bit or tip according to one example of the present invention.

FIG. 5B is a side view of the cutting bit of FIG. 5A.

FIG. 5C is a front view of the cutting bit of FIG. 5A.

FIG. 7 is an enlarged view of the circle 7 of FIG. 6B yet not showing the cutting tool assembly and cutting bit in cross-section.

FIG. 10 is a view as in FIG. 9 but illustrating an alternative example of the present invention.

FIG. 11 is a view as in FIG. 9 and FIG. 10 but illustrating a further alternative example of the present invention.

DETAILED DESCRIPTION OF THE INVENTION

Figure 1:
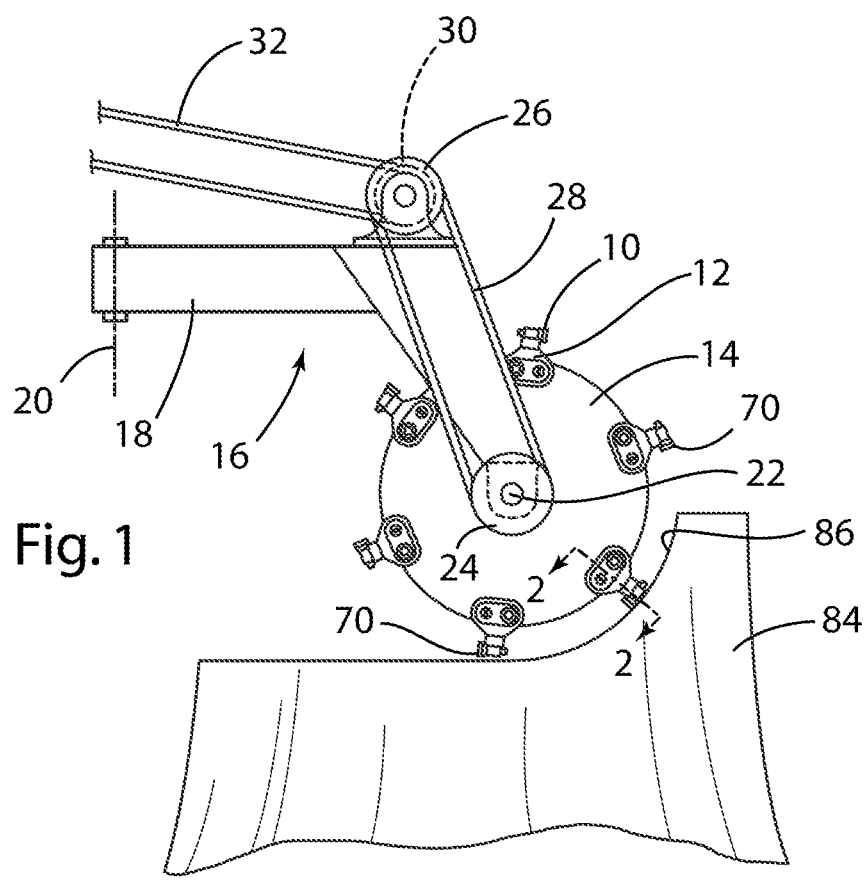
FIG. 1 a schematic side view will of a stump cutting apparatus using a cutting tool having a cutting bit or tip according to the present invention.
Figure 4A:
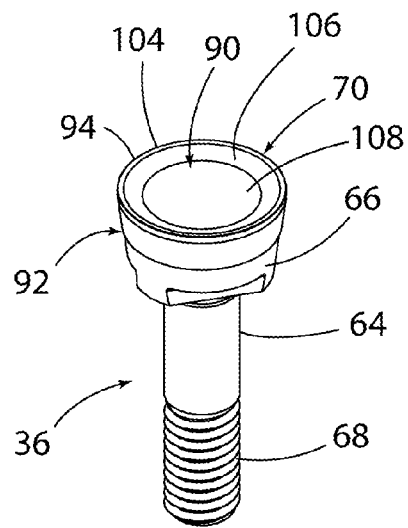
FIG. 4A is a perspective view of a cutting tool having a cutting bit according to one example the present invention.
Figure 4B:
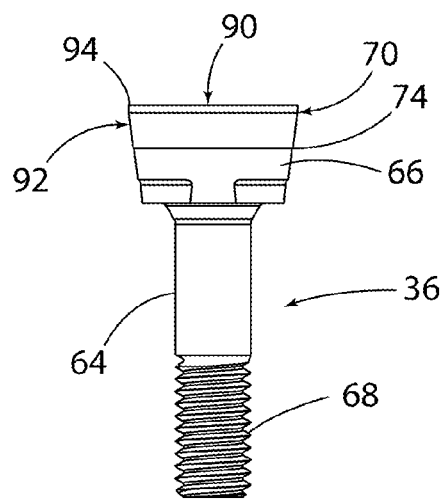
FIG. 4B is a side view of the cutting tool of FIG. 4A.
Figure 4C:
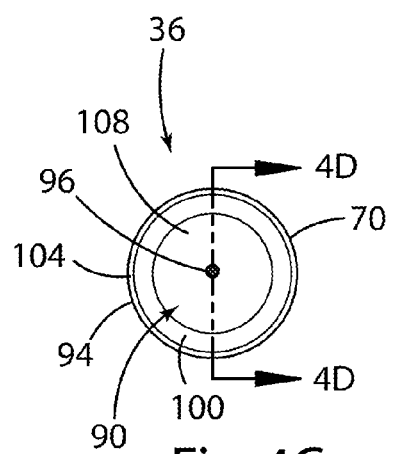
FIG. 4C is an end view of the cutting tool of FIG. 4A.
Figure 4D:
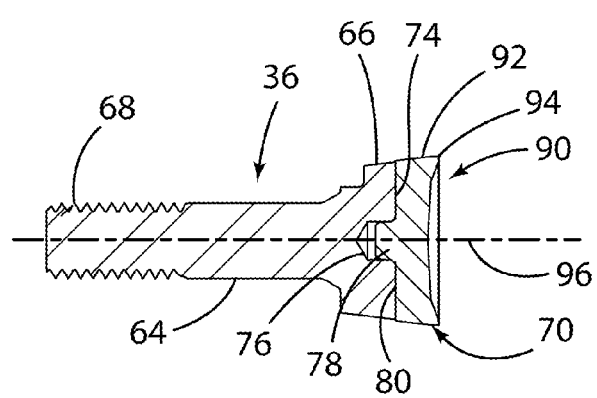
FIG. 4D is a cross-sectional view of the cutting tool of FIG. 4A taken along lines 4D-4D of FIG. 4C.

Referring to the figures, wherein like numerals indicate like or corresponding parts throughout the several views, Referring to FIG. 1, a stump cutting bit 10 according to the present invention is shown as part of a stump cutting tool assembly 12 secured to a cutting wheel 14 of a stump cutting apparatus, seen generally at 16. The stump cutting apparatus 16 includes a frame 18 pivotally supported for pivotal movement about a pivot axis 20 to a remaining portion (not shown) of the stump cutting apparatus 16.

The cutting wheel 14 is rotatably mounted at the other end of the frame 18 for rotational movement about its rotational axis 22. The stump cutting apparatus 16 also includes a first pulley 24 attached to the cutting wheel 14 and a second pulley 26 attached to the frame 18. A belt 28 interconnects the first pulley 24 and the second pulley 26. A third pulley 30 connects to the second pulley 26 and a second belt 32 connects the third pulley 30 with a power source such as a motor (not shown). The power source moves the second belt 32 to rotate the third pulley 30 and correspondingly the second pulley 26. Rotation of the second pulley 26 causes the first belt 28 to move which correspondingly rotates the first pulley 24 and the cutting wheel 14. It should be understood that a stump cutting apparatus 12 of this type is conventional and known in the art. Other drive mechanisms, such as hydraulic drive units, may also rotate the cutting wheel or drum 14 about its rotational axis 22. Also, while shown with a cutting disk or wheel 16, stump cutting bit 10 according to the present invention may be used with a stump cutting tool assembly 12 attached to a cutting drum.

The stump cutting tool assembly 12 typically includes a tool holder 34 and a cutting tool 36. The tool holder 34, sometimes referred to as a pocket, includes a wheel or base portion 38 having a front or outer surface 40 and a rear or inner surface 42. The rear or inner surface 42 is the surface contacting the cutting wheel 14 when the tool holder 34 is attached to the cutting wheel 14. Side surfaces 44 interconnect the respective outer and inner surfaces 40, 42. In one embodiment, the respective outer and inner surfaces 40, 42 are generally planar, with the overall surface area of the outer surface 40 being less than that of inner surface 42. The tool holder 34 has a tool portion 46. The tool portion 46 includes a neck or support member 48 having a proximal end connected to the wheel or base portion 38 and a distal end located opposite the proximal end connected to the tool portion 46. Similar to the wheel or base portion 38, the neck 48 includes an outer surface 50 and an inner surface 52 along with opposing side surfaces 54 extending between the respective outer surface 50 and inner surface 52. A cutting tool support portion 56 located at the distal end extends longitudinally between the respective opposing side surfaces 54. The cutting tool support portion 56 includes first and second ends 58, 60 with an aperture 62 extending longitudinally through the cutting tool support portion 56 between the first and second ends 58, 60.

FIGS. 4A-4D illustrate a cutting tool, seen generally at 36, typically supported on a cutting wheel 14 using the tool holder 34. The cutting tool 36, also referred to herein as a cutting tooth 36, includes a generally cylindrical shank 64 having a head portion 68 located at one end thereof. The opposite end of the shank 64 may include a plurality of threads 68 typically used in conjunction with a threaded fastener, such as a nut 72, to secure the cutting tool 36 to the tool holder 34. In operation, the shank 64 extends through the aperture 62 in the cutting tool support portion 56 wherein the head portion 68 contacts the first end 58 of the cutting tool support portion 56. As known, the nut 72 engages the threads 68 and upon tightening secures the shank 64 and correspondingly the cutting tool 36 to the tool holder 34.

A cutting bit 70, also referred to as a cutting tip 70, is attached to the front surface 74 of the head portion 66. The front surface 74 of the head portion 66 may include a shallow depression or indentation 76 sized to receive a corresponding projection 78 extending outward from the rear face or surface 80 of the cutting bit 70. The complementary indentation 76 and projection 78 are such that the projection 78 functions to properly locate and orient the cutting bit 70. The cutting bit 70 may be made of a material such as tungsten carbide and attached or fastened to the head portion 66 by some type of fastening mechanism including welding, brazing, bonding, adhesive or a mechanical fastener.

The foregoing example of an apparatus or assembly for securing a cutting bit to a cutting wheel notwithstanding, other mechanisms or assemblies can secure a cutting bit to a cutting wheel and the inventive concepts relating to a cutting bit set forth herein are not limited to a specific cutting tool, tool holder or cutting wheel.

Turning to FIGS. 2-3, as known, during a stump cutting or grinding operation the stump cutting apparatus 16 typically moves or swings the cutting wheel 14 back and forth in a side to side motion. Initially, the apparatus swings or moves the cutting wheel either to the right or to the left to cut or grind away a portion of the stump. Upon completing the first swing or pass, the cutting wheel moves incrementally lower or forward towards the stump, after which the wheel is swung in the opposite direction. FIG. 2 illustrates one example of the cut path or profile of the stump cutting apparatus 16. As the apparatus 16 moves to the right, in the direction shown by arrow 82, the cutting tool 36 and corresponding cutting bit 70 located in tool holder 34 generates, as shown in the schematically illustrated stump 84, a cut profile or path 86. Once the cut path is completed in one direction, the cutting wheel 14 advances—again by either lowering incrementally or moving forward a short distance—after which the cutting wheel 14 then moves or swings in the opposite direction, that is to the left, opposite of the arrow 82.

As illustrated in FIG. 3, when the cutting wheel 14 cuts in the direction illustrated by the 82, the cutting bit 70 of the cutting tool 36 engages the workpiece or stump to form a propagating cut profile 86. The cutting bit 70 according to one example of the present invention has a generally cylindrical configuration that engages the stump 84 at a point approximately half of the diameter D of the cutting bit 70 leaving or generating the cut profile 86. It should be noted that the cut profile 86 illustrated in FIG. 3, wherein only a segment of the semicircular edge of the cutting tip 70 is advancing the cut, other depths of cut and/or cutting motions may produce different cut profiles 86. It is contemplated to use up to one half of the circumference of the cutting bit 70, however other cutting depths may be preferred depending on the operating conditions and operator discretion. As a result of the characteristic side-cutting motion practiced in stump-cutting operations, reaction forces (represented by inwardly radiating arrows) press laterally and non-uniformly against the cutting bit 70 encouraging chatter and other harmful effects.

FIGS. 5A-5D illustrate an example of one configuration of the cutting bit or tip 70. As illustrated, the cutting bit 10 includes a rear face or mounting surface 80, with the rear face or mounting surface 80 placed adjacent to the front surface 74 of the head portion 66 of the cutting tool 36. Opposite the rear face 80 is a front face 90 of the cutting bit 70. In the present example, the cutting bit 70 has a generally cylindrical configuration having an outer peripheral surface or side surface 92 extending between the front face 90 and the rear face 80. That is to say, the cutting tip 70 may be viewed as a body of revolution, with its front face 90 presented toward or into the direction of cut when mounted on a cutting wheel 14 like that shown in FIG. 1. The intersection of the front face 90 and side surface 92 forms an annular cutting edge 94. The annular cutting edge 94 establishes a cutting diameter D for the cutting tooth 36. Thus, when considering again FIGS. 2 and 3, the cutting edge 94 is primarily responsible for forming the cut profile 86. A longitudinal axis or centerline 96 of the cutting bit 70 extends through and between the front face 90 and the rear face 80. The side surface 92 encircles the longitudinal axis 96 in a ring-like manner. In the disclosed example, the rear face 80 is located in a plane 98 generally perpendicular to the longitudinal axis 96.

The side surface 92 preferably is formed with a compound configuration including a front relief or margin surface 100 and a rear relief surface 102. As illustrated, the front relief surface 100, i.e., margin surface, extends rearward, that is toward the rear face 80, from the cutting edge 94 in a direction substantially parallel to the longitudinal axis 96. That is to say, the margin surface 100 may have a generally cylindrical shape consistent, or generally consistent, with the diameter D of the cutting edge 94. The margin or front relief surface 100 may have a width (W), as measured in the longitudinal direction, within a range of 3-8% of the cutting diameter D. In more specific examples, the longitudinal width W of the margin surface 100 is about 4-6% of the cutting diameter D. And in certain exemplary embodiments, exceptional results have been achieved when the longitudinal width W of the margin surface 100 is between about 4.3-5.2% of the cutting diameter D. As an example, when the cutting diameter D is between about 0.8-1.2 inches, the width W of the margin or first relief surface 100 may be about 0.010 inches to 0.090 inches. In one example the width (W) is between 0.035 inches and 0.055 inches. The rear relief surface 102 extends rearward; from the margin or front relief surface 100 to the rear face 80 in a direction sloping inwardly towards the longitudinal axis 96. Although the cutting bit 70 has a generally cylindrical configuration, the diameter of the cutting bit 70 at the front face 90 (i.e., the cutting diameter D) is greater than the diameter of the cutting bit 70 at the rear face 80.

As illustrated in FIG. 5C, when viewed from the front, i.e., the direction of the longitudinal axis 96, the front face 90 of the cutting bit 70 has a generally circular shape. In the disclosed example, the front face 90 is a compound configuration composed of at least two, and in the illustrated embodiment three, concentric surfaces. The two primary features of the front face 90 are an outer surface 104 (also referred to as hook surface 104), and an intermediate surface 106 (also referred to as a chip-breaking surface 106). The illustrated embodiments also depict an optional third inner surface 108 (also referred to as a gullet surface 108). The outer or hook surface 104 is positioned adjacent the side surface 92 wherein the edge 94 is formed at an intersection of the outer surface 104 and the front relief surface 100. The inner surface 108 is located in and forms the center portion of the front face 90. The inner surface 108, which contains the longitudinal axis 96, is suggested as optional in that in alternative contemplated embodiments the inner or gullet surface 108 may be omitted in favor of an extended intermediate, i.e., chip-breaking, surface 106. The intermediate surface 106 is thus located radially inward of the outer surface 104, and between the outer surface 104 and the inner surface 108 when the latter is present. In the present example, the intermediate surface 106 is illustrated as a single, continuous, and uninterrupted surface. In another aspect, the chip-breaking or intermediate surface 106 may include interruptions or discontinuities causing breaks or lack of continuity in the intermediate surface 106. For example, the angular relationship between various portions or segments of the intermediate surface 106 may change. In another example, the intermediate surface 106 may include upsets, ridges or other protuberances causing interruptions or discontinuities. While the present example illustrates a generally circular/cylindrically shaped cutting bit 70 this is for illustration only, other polygonal shapes and configurations, are also contemplated including, hard insert shapes or configurations used with existing cutting tools.

Figure 5D:
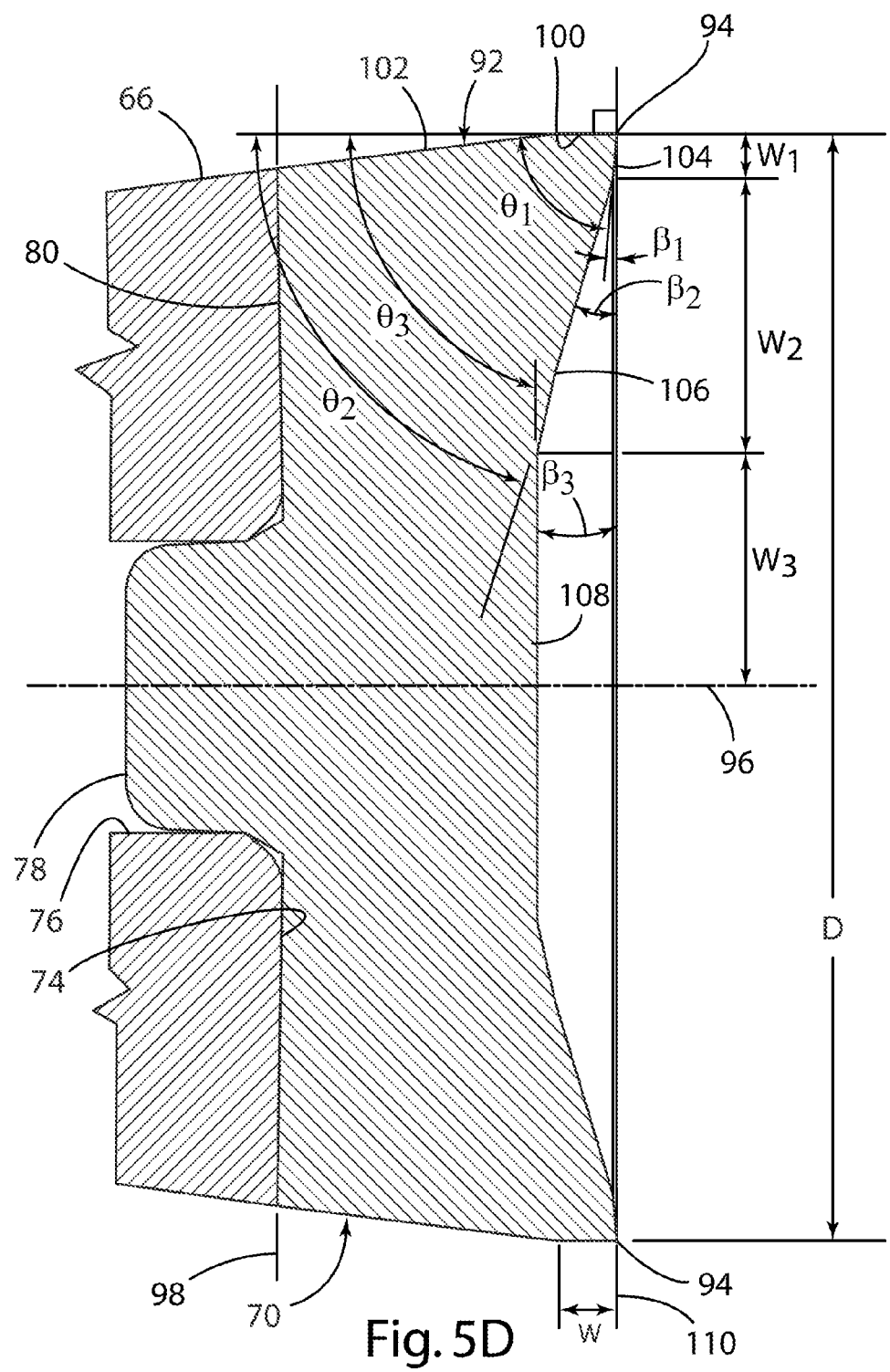
FIG. 5D is a cross-sectional view of the cutting bit of FIG. 5A taken along lines 5D-5D of FIG. 5C.
Figure 9:
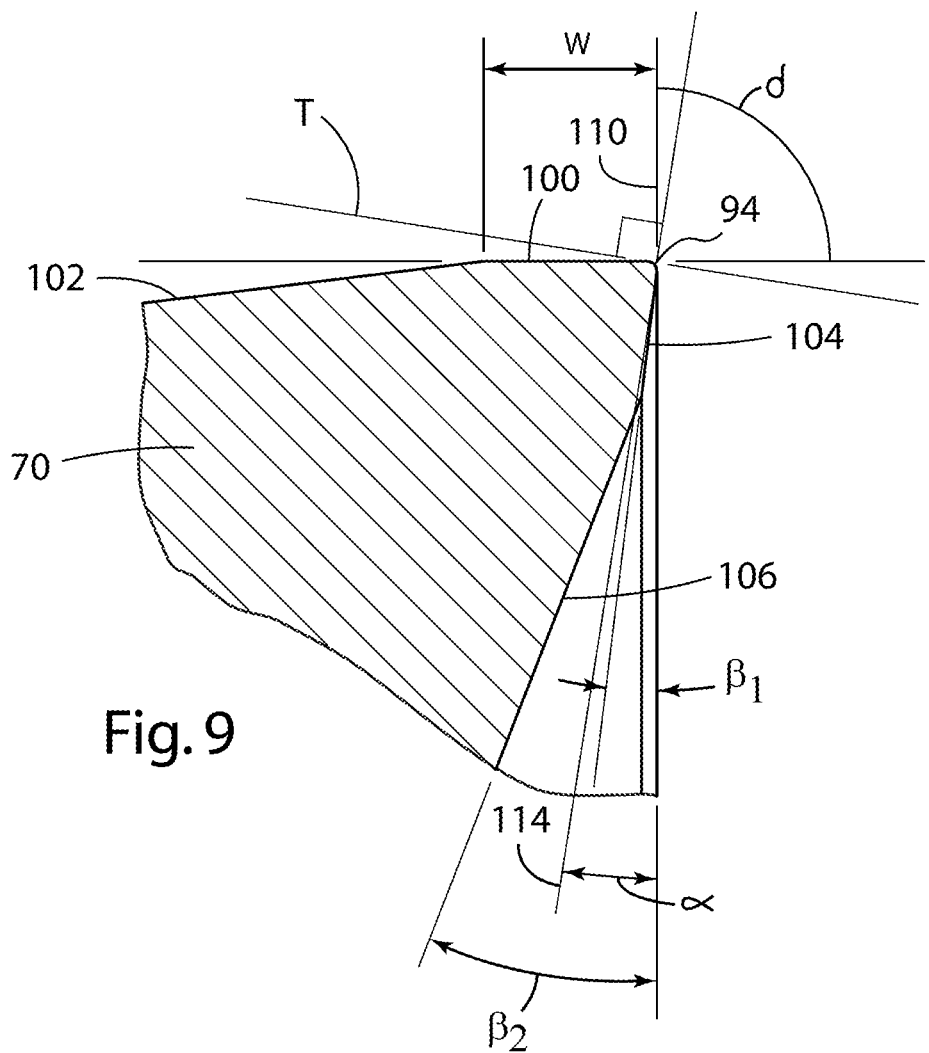
FIG. 9 is an enlarged view of the circle 9 of FIG. 8.

FIG. 5D shows the cutting tip 70 as sectioned through the longitudinal axis 96 and bisecting the cutting diameter D. In this view, a plane 110 of the front face 90 is shown. The plane 110 is orientated perpendicular to the longitudinal axis 96 and contains the full circular shape of the cutting edge 94. The hook or outer surface 104 slopes inwardly from the plane 110 toward the rear face 80, forming a concave or inset configuration. In one example, the outer surface 104 is a frustoconical surface having an axis coinciding with the longitudinal axis 96. The hook surface 104 is thus viewed as having a concave frustoconical pitch that extends radially inwardly from the cutting edge 94. The included angle ($\theta_1$) between the frustoconical hook surface 104 and the frustoconical margin surface 100 is preferably between about 80-89 degrees, as shown in FIGS. 9-11. The included angle ($\theta_1$) between the frustoconical hook surface 104 and the frustoconical margin surface 100 may be further restricted to between about 83-86 degrees. Still further, exceptional results have been achieved when the included angle ($\theta_1$) between the frustoconical hook surface 104 and the frustoconical margin surface 100 is limited to about 84-85 degrees. Setting the included angle ($\theta_1$) between about 80-89 degrees enables the cutting tip 70 to achieve a reasonably sharp cutting edge 94 that is also tough and robust enough to withstand the particular rigors of stump grinding. Outside of this range, and within the context of the overall configuration combination, the cutting edge 94 will either be too fragile or too blunt, thus resulting in a short service life and inefficient operation. Furthermore, the included angle ($\theta_1$) within the range of about 80-89 degrees has been found to yield prolonged edge retention as compared with prior at designs. For tree stump grinding operations, where a high-speed spinning cutting wheel is laterally swung from side-to-side in dense and gnarly wood, a cutting tip 70 having an included angle ($\theta_1$) between 80-89 degrees has been found to ferociously cut away a wooden stump with minimal chatter particularly when combined with a margin surface 100 having a width (W) within a range of 3-8% of the cutting diameter D. And furthermore, an included angle ($\theta_1$) within the stated range produces relatively consistent shredded wood pulp.

The outer hook surface 104 has a relatively narrow radial width $W_1$ that may be restricted to between about 2-8% of the cutting diameter D. In certain embodiments, the radial width $W_1$ of the hook surface 104 may be restricted further to the range of about 3-6% of the cutting diameter D. And in certain exemplary embodiments, exceptional results have been achieved when the radial width $W_1$ of the hook surface 104 is between about 3.1-5.2% of the cutting diameter D. As an example, when the cutting diameter D is between about 0.8-1.2 inches, the radial width of the hook or outer surface 104 may be about 0.032 inches to 0.040 inches. Limiting radial width $W_1$ of the outer hook surface 104 to between about 2-8% of the cutting diameter D further contributes to a cutting tip 70 that is able to withstand the unique rigors of stump grinding. Outside of this range, and within the context of the overall configuration combination, the cutting edge 94 will experience a shorter service life and be less efficient in use. For tree stump grinding operations, where a high-speed spinning cutting wheel is laterally swung from side-to-side in dense and gnarly wood, an outer hook surface 104 that has a radial width $W_1$ between about 2-8%, particularly when combined with a margin surface 100 having a width (W) within a range of 3-8% of the cutting diameter D, has been found to substantially reduce chatter. This is, at least in part, because the cutting edge 94 is required to cut over approximately 90° of its circumference. By restricting the hook width $W_1$ and the margin width W to these ranges, the cutting tip 70 will perform optimally over all regions of the cutting edge 94 that encounter wood material. And furthermore, by holding the hook width $W_1$ and the margin width W to these ranges relative to the cutting diameter D, relatively consistent shredded wood pulp is generated.

The intermediate surface 106, or chip-breaking surface 106, slopes inwardly from the plane 110 toward the rear face to a greater degree than the outer hook surface 104. In one example, the intermediate surface 106 is a frustoconical surface having an axis coinciding with the longitudinal axis 96, and extends radially inwardly from the outer hook surface 104 at a further angle of between about 10-14 degrees. So for example, if the outer hook surface has a frustoconical pitch of about 7 degrees as measured from the plane 110, the chip-breaking surface 106 may have a frustoconical pitch of about 17-21 degrees as measured from the plane 110. In certain embodiments, the frustoconical pitch of the chip-breaking surface 106 may be restricted further to the range of about 11-13 degrees relative to the outer hook surface 104. Exceptional results have been achieved when the frustoconical pitch of the chip-breaking surface 106 relative to the outer hook surface 104 is about 12 degrees. Breaking the cut shavings of wood at just the right point in the grinding process is necessary to achieve shredded wood pulp of a consistent size, and which is not too large or too small. Considering that the typical cutting is over a semi-circular region of the cutting edge (FIG. 3), it will be appreciated that the front face 90 will tend to make scoop-like cuts which produce wood curls having a particular natural curl. The cutting tip 70 of this present invention has been designed to optimize the point at which these curled wood chip shavings are broken to achieve shredded wood pulp of an optimal size for stump-grinding uses. Toward this end, the chip-breaking surface 106 is formed with a frustoconical surface that is pitched relative to the outer hook surface 104 in the range of 10-14 degrees. Applicant has discovered that setting these two active surfaces 104, 106 relative to each other within the stated range is particularly effective to produce optimally-sized shredded wood pulp, and in turn to most efficiently grind a wide range of in situ wood stump types and conditions.

The inner surface 108 comprises the central dished region of the front face 90 and is shown having a base or bottom portion that is generally parallel to the plane 110 and perpendicular to the longitudinal axis 96. In the present example the inner surface 108 is a generally flat surface as opposed to the outer and intermediate surfaces 104, 106 which are angular surfaces. The inner surface 108 operates in a somewhat comparable manner to the gullet region in a circular saw blade. However in this present application, the gullet or inner surface 108 is dished. It should be recognized that because the cutting tip 70 typically produces wood curls having a natural curvature inwardly and away from the cut, the inner surface 108 is configured to break the curl at an optimal angle so as to achieve appropriate-sized wood shavings.

As shown in FIGS. 5C-5D each of the outer, intermediate, and inner surfaces 104, 106, 108 each have a predetermined width; that is, a predetermined distance from the cutting edge 94 inwardly toward the longitudinal axis 96. In one aspect, the width ($W_1$) of the outer surface 104 may vary in accordance with the above-described ranges. Exceptional results have been achieved when the radial width ($W_1$) of the outer surface 104 is restricted from 0.010 inches to 0.090 inches and the width ($W_2$) of the intermediate surface 106 is held to about from 0.100 inches to 0.350 inches. In the present example, the width ($W_1$) of the outer surface 104 is between 0.030 inches and 0.045 inches and the width ($W_2$) of the intermediate surface 104 is between 0.200 inches and 0.260 inches. The width ($W_3$) of the inner surface 106 is the remaining distance to the longitudinal axis 96. If the cutting bit 70 has a 1 inch diameter than the width W3 of the inner surface 106 in the present example would be between 0.20 inches and 0.27 inches.

As illustrated in FIG. 5D each of the outer, intermediate, and inner surfaces 104, 106, 108 lie at a different angle with respect to plane 110 perpendicular to the longitudinal axis 96 and with respect to the front relief surface 100. Given that the front relief surface 100 is parallel to the longitudinal axis 96 it is also perpendicular to and forms a 90° angle with respect to plane 110 and plane 98. Using the cutting edge 94 as the vertex, the conical angle θ is measured between the front relief surface 100 and the respective outer, intermediate and inner surfaces 104, 106, 108. Measuring from the front relief (i.e., margin) surface 100, the outer or hook surface 104 has an acute angle $θ_1$ greater than 80° but less than 90°, the intermediate surface 106 has an acute angle $θ_2$ greater than 65° but less than 80°, and the inner surface 108 is has an angle $θ_3$ in the range of about 80° to 100° or alternatively may be semi-spherical or domed. In one example, the outer surface 104 has an acute angle $θ_1$ between 84° and 86°, the intermediate surface 106 has an acute angle $θ_2$ between 70° and 75°, and the inner surface 108 is generally perpendicular or has an angle $θ_3$ equal to 90°.

The foregoing angles $θ_1$, $θ_2$, and $θ_3$ are but examples. If the angle or orientation of the front relief surface 100 changes with respect to the longitudinal axis 96, then the angles $θ_1$, $θ_2$, and $θ_3$ would also change. Further, during manufacturing, the angles of the respective outer, intermediate, and inner surfaces 104, 106, 108 may need to be measured from a common or reference plane, such as plane 98 containing the rear face 80 of the cutting bit 10, assuming the rear face 80 is oriented perpendicular to the longitudinal axis 96. As illustrated in FIG. 5D, the outer, intermediate, and inner surfaces 104, 106, 108 are oriented at an angle β subtended by each surface and the plane 98. The outer surface 104 has an acute angle $β_1$ greater than 0° and up to 10°, the intermediate surface 106 has an acute angle $β_2$ greater between 10° and 40°, and the inner surface 108 has an angle $β_3$ equal to −10° to 10°. In one example, the outer surface 104 has an acute angle $β_1$ between 4° and 6°, the intermediate surface 106 has an acute angle $β_2$ between 15° and 20°, and the inner surface 108 is generally parallel or has an angle $β_3$ equal to 0°.

The foregoing examples notwithstanding, the angular relationship between the various surfaces may change to achieve a particular angular relationship with the adjacent surface. For example, the angle $β_3$ of the inner surface 108 is generally parallel to the rear face 80 making it somewhat flat to avoid reduction or thinning of the material of the cutting bit 70 between the front face 90 and rear face 80. Depending on the particular configuration of the cutting bit 70, the third or inner surface 108 may have a positive angle; that is, the inner surface 108 may slope outwardly toward the front face 90. Further, the inner surface 108 may include a surface change, which is a change in angularity or an angular offset that correspondingly results in an interruption or discontinuity.

The present invention further contemplates the addition of multiple or faceted intermediate surfaces 106 located interior of the outer surface 104, either in addition to or in conjunction with the inner surface 108. Similar to the intermediate surface 106 as previously described, each additional intermediate surface (i.e., each facet surface) may have a particular width and angular relationship. For example, an additional intermediate surface having an angle $β_2$ between 7° and 12° could be added between the initial intermediate surface 106 and the inner surface 108. In this example, the intermediate surface 106 changed in angularity since the angle $β_2$ changed from between 15° to 20° to between 7° and 12°. The intermediate surface 106 could include a surface sloping outwardly rather than inwardly resulting in a change in angularity or a plurality of angularly offset surfaces. In one aspect it is the change in angularity or plurality of angularly offset surfaces that form interruptions or discontinuities causing breaks or lack of continuity in the intermediate surface 106. A cutting bit 70 configured according to the present invention includes multiple surfaces or faces of varying widths and located at varying angles. It should be understood that the configuration in the illustrated embodiments starts with the hook or outer surface 104 and ends with the inner surface 108 and contains at least one intermediate surface 106 between them whereby there is a surface change, and correspondingly an interruption or discontinuity, between the outer surface 104 and the inner surface 108.

Figure 6A:
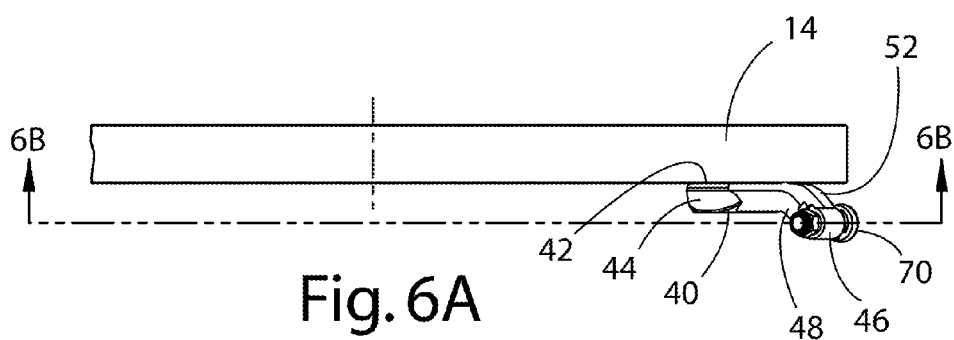
FIG. 6A is a top view of a cutting tool or cutting tooth assembly having a cutting bit according to one example of the present invention connected to a cutting wheel.
Figure 6B:
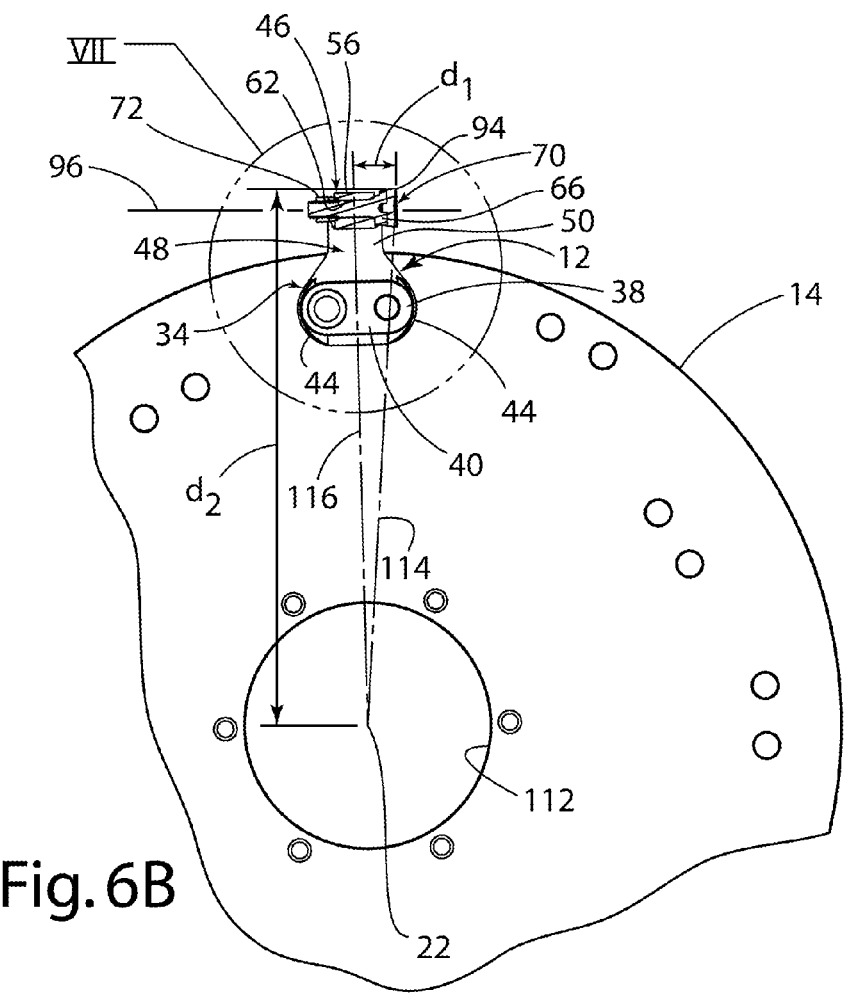
FIG. 6B is a side view of the cutting tool assembly and cutting bit connected to a cutting wheel illustrated in FIG. 6B with a portion of the cutting tooth assembly and cutting bit shown in a cross-section taken along the lines 6B-6B of FIG. 6A.

In FIGS. 6A-6B there is shown a cutting tool assembly 12 including a cutting tool 36 having a cutting bit 70 according to the present invention located in a tool holder 34 attached to a cutting wheel 14. The cutting wheel 14 includes a central aperture 112 that rotates about the rotational axis 22. A radial line 114, also referred to as a cutting radial 114, extends from the axis 22 outwardly to the outermost point of the cutting edge 94 of the cutting bit 70. That is to say, the cutting radial 114 is an imaginary or constructive line, emanating perpendicularly from the rotational axis 22 and intersecting the most distant point of the cutting edge 94. In most cases, the cutting radial 114 is not contained within the plane 110 of the cutting edge 94, however such is a contemplated alternative. The cutting bit 70 includes a rake angle defined, generally, as the angle between the top cutting surface of a tool and a plane perpendicular to the surface of the work. For rotary cutting applications, the surface of the work is typically defined by a tangent to the direction of motion, which as shown in FIG. 9 is a tangent line T taken at the point of intersection between the cutting radial 114 and the cutting edge 94. The rake angle in this present context, therefore, is the angle made by the rake face and a radius measured in a plane normal to the axis. Or said another way, the rake angle of this present invention is the angle measured between the cutting radial 114 and the hook or outer surface 104 in a plane passing through both the longitudinal axis 96 and also the cutting radial 114. Or perhaps more simply, in the cross-sectional view of FIGS. 8-11, the rake angle is the interior angle measured between the cutting radial 114 and the hook surface 104. As will be described more fully below, the rake angle is preferably restricted to a range between about −2° and +2°.

Figure 8:
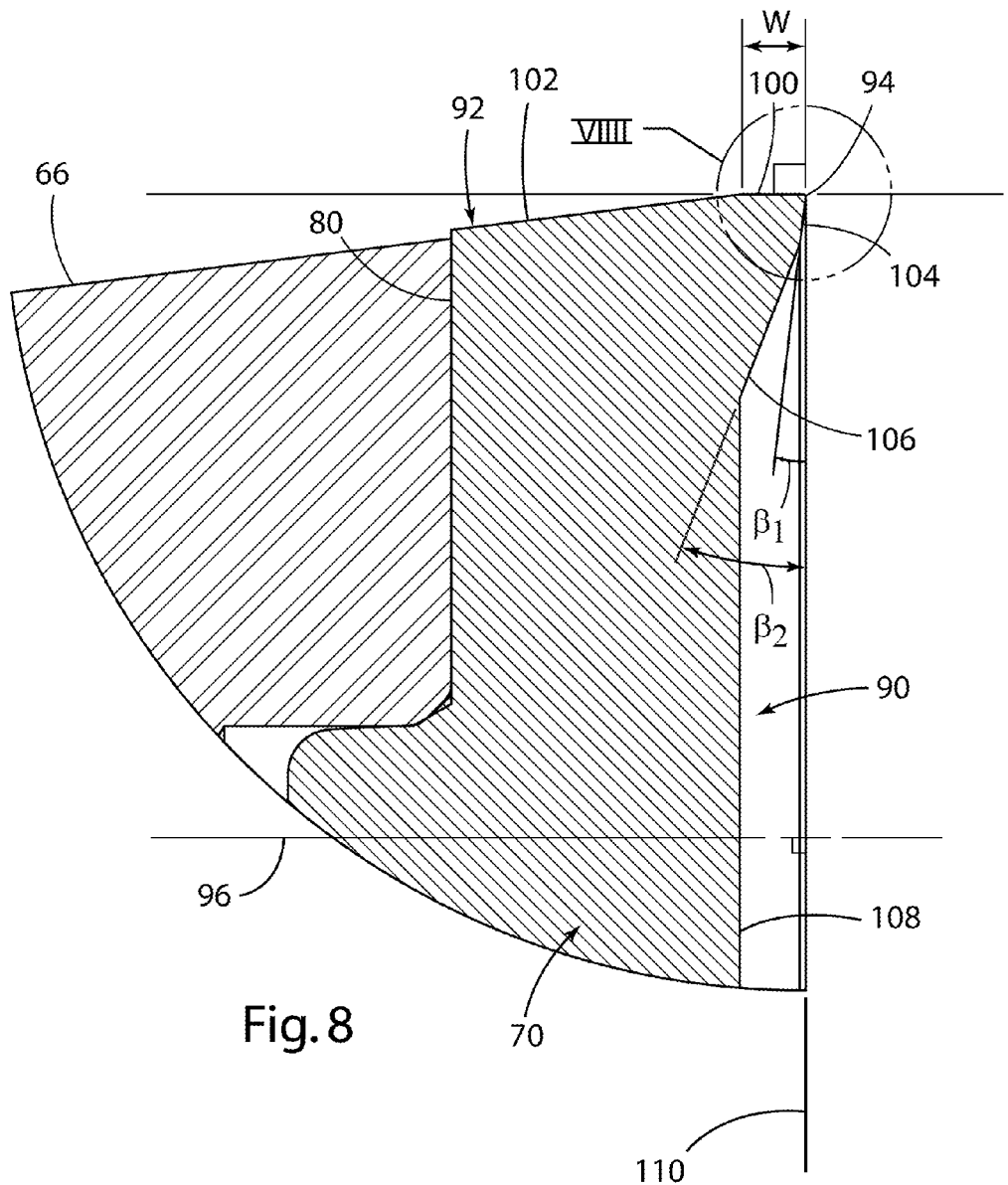
FIG. 8 is an enlarged view of the circle 8 of FIG. 7 yet showing the cutting bit or tip in cross-section.

FIG. 6B illustrates the position of the cutting bit 70, and more particularly, the cutting edge 94 on the cutting wheel 14 relative to the rotational axis 22. The instantaneous direction of motion of the cutting tool 36 and corresponding cutting bit 70 is a tangent to the cutting wheel 14 shown by the longitudinal axis 96 of the cutting tool 36, if one momentarily ignores the lateral side-to-side motion of the cutting wheel assembly 14. Moving the cutting bit 70 along that longitudinal axis in its pocket, such as during a set-up or replacement procedure, thus relocates the cutting edge 94 further ahead of or further behind the pocket radial 116, and therefore will result in corresponding changes to (i.e., decrease or increase of) the rake angle. That is to say, changing the angle of the cutting radial without a corresponding change to the included angle ($\theta_1$) between the hook surface 104 and the margin surface 100 will result in a change to the rake angle. To determine the angle of the cutting radial 114 mathematically, use distances $d_1$ and $d_2$. The variable d1 is the longitudinal distance the cutting edge 94 is positioned from a pocket radial line 116 that is set perpendicular to the longitudinal axis 96 of the cutting bit 70. The variable $d_1$, therefore, coincides with the longitudinal axis 96 of the cutting tool 36, and bisects the tool holder 34. The variable $d_2$ is the distance the maximum outer point of the cutting edge 94 is positioned from the rotational axis 22 of the cutting wheel 14, as measured along the pocket radial line 116. In one example, $d_1$ equals 1.22 inches and $d_2$ equals 9.75 inches resulting in an angle α of approximately 7° between the pocket radial 116 and the cutting radial 114 extending to the edge 94. The angle between the pocket radial 114 and the plane 110 is the same angle α—approximately 7° in this example—as both are related in the form of Alternate Interior Angles. As shown in FIGS. 7-8 the plane 110 is perpendicular to the longitudinal axis 96 of the cutting bit 70 and parallel to pocket radial 116.

As illustrated in exemplary embodiment of FIG. 8, the outer surface 104 has an angle of 5° with respect to the plane 110 and the intermediate surface 106 has an angle of 17° with respect to the plane 110. As illustrated in the companion FIG. 9 this results in an effective rake angle, for the outer surface 104 relative to the radial 114 of negative 2° since, the cutting direction is along the tangent line T. Further, the angle of the intermediate surface 106, with respect to the radial 114 is 10°. Generally, the top of the cutting bit 70, specifically the front relief surface or margin 100 and outer surface 104, will wear along a line parallel to the tangent line T. This statement of wear, of course, considers primarily the rotational action of the cutting wheel 14. Side-to-side motion of the cutting wheel 14, as described above in connection with FIGS. 1-3, will result in added wear to the outside portions of the cutting edge 94.

FIGS. 10 and 11 show alternative examples of a cutting bit 70. FIG. 10 shows the cutting bit 70 located in the same position as the previous example having a hook or outer surface 104 set at an angle of 7° with respect to the plane 110. That is to say, the cutting radial 114 coincides with the hook surface 104 in this example. If the cutting radial 114 has an angle α of 7° with respect to the plane 110, then the effective rake angle of the outer surface 104 is 0°. In the still further alternative example of FIG. 11, the cutting bit 70 is located in the same position as the previous examples, but the outer surface 104 is set at an angle of 9° with respect to the plane 110. Therefore the effective rake angle of the outer surface 104 is positive 2°.

While the configuration of the cutting bit 70 as described in the preceding examples includes a predetermined configuration and specific angles, the orientation of these surfaces changes with respect to the position of the cutting bit 70 on the cutting wheel 14. The placement of the cutting bit 70 respect to the pocket radial line 116 determines the effective rake angle of the cutting bit 70. In part because the surfaces of the front face are based on the longitudinal axis 96 of the cutting bit 70, which corresponds to the longitudinal axis of the cutting tool 36, and correspondingly the longitudinal axis 96 of the cutting tool is mounted perpendicular to the pocket radial 116 extending outward from the rotational axis 22. Changing the position or location of the cutting bit 70 with respect to the pocket radial 116 changes the relative angles of the respective surfaces 104, 106 and 108 with respect to the cutting radial 114. The effective rake angle of the cutting bit 70 thus varies depending on its location on the cutting wheel.

Figure 12A:
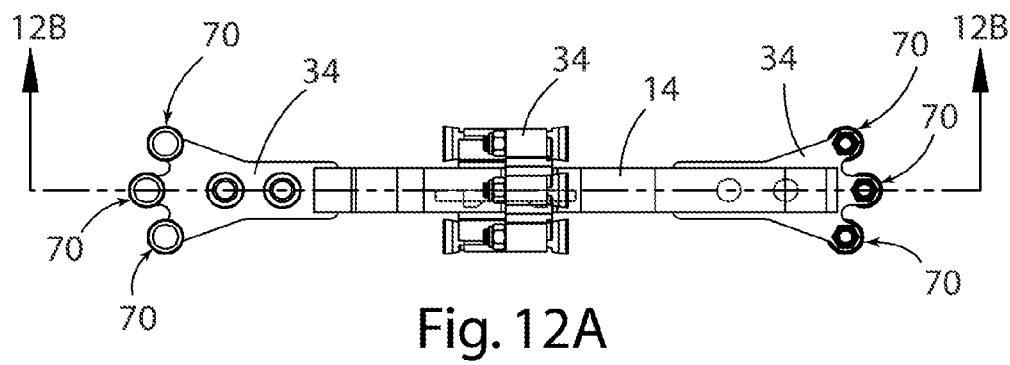
FIG. 12A is a top view of an alternative stump cutting wheel and stump cutter tool assembly having a cutting bit according to the present invention.
Figure 12B:
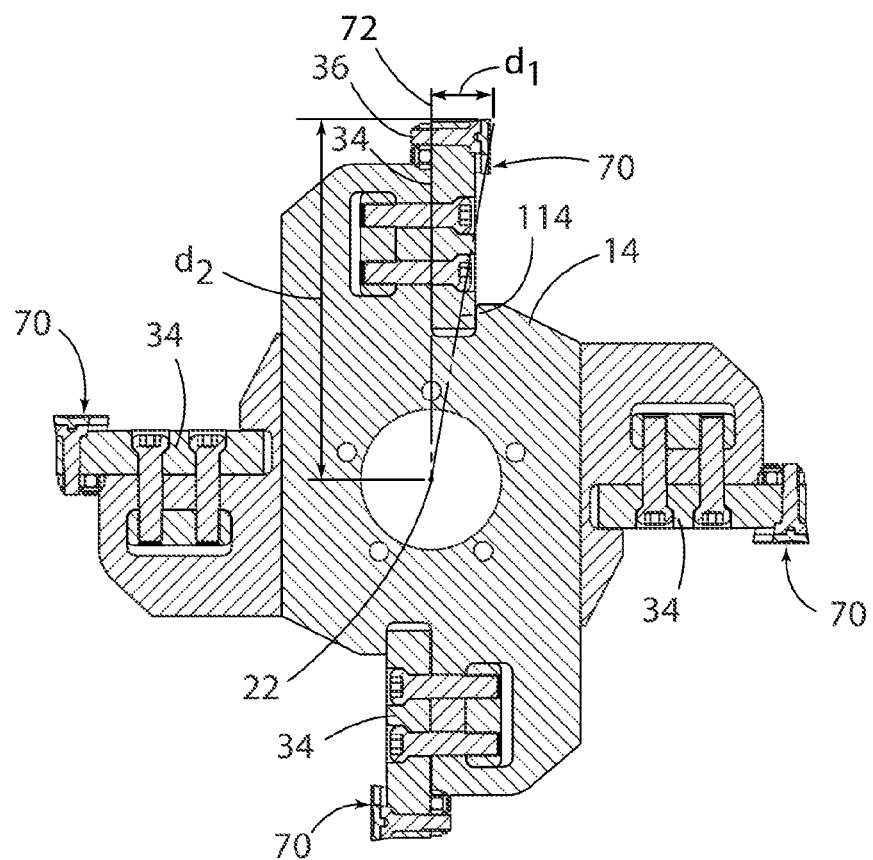
FIG. 12B is a cross-sectional view taken along lines 12B-12B of FIG. 12A.

FIGS. 12A-12B illustrate a further example of the present invention for a different style cutting wheel. In this example, the measurements $d_1$ and $d_2$ are used to calculate the angle α of the cutting radial 114 extending outwardly from the rotational axis 22. The angle α is then used or considered when determining the angle of the respective outer, intermediate, and inner surfaces 104, 106, 108 with respect to a plane 110. The rake angle of the various surfaces considers the position of the cutting edge 94 of the cutting bit 70.

The longitudinal distance $d_1$, i.e., the distance between the pocket radial 116 and cutting edge 94 of the cutting tip 70, coupled with the distance $d_2$, the distance from the rotational axis 22 to the cutting edge 94 of the cutting tip 70, combine to locate the cutting edge 94 of the cutting tip 70. It should be understood that varying either one of these parameters will change the effective angle between the outer, intermediate, and inner surfaces 104, 106, 108 of the cutting tip 70 and the workpiece or stump. It may be necessary to start with a cutting tip 70 having different angles then those set forth in the embodiment above, which is only an example of one set of surface angles that can be used with a cutting bit 70.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A stump cutter bit of the type mounted to a power-driven cutting wheel and rotated at high speed to grind away an earthen-rooted tree stump, said stump cutter bit comprising:
    a shank extending along a longitudinal axis, said shank having a head portion located at one end thereof and screw threads at the other end thereof, the head portion including a front surface centered about and oriented generally perpendicular to said longitudinal axis, a depression formed in said front surface along said longitudinal axis,
    at least one generally circular cutting tip centered about said longitudinal axis adjacent said head portion of said shank, said cutting tip having a front face configured in use to be scraped across the wooden body of a tree stump generally along said longitudinal axis, an annular margin surface centered about said longitudinal axis and surrounding said front face, an annular cutting edge formed at an intersection between said margin surface and said front face, said cutting edge establishing a cutting diameter of said cutting tip,
    said front face including an outer annular hook surface and an intermediate annular chip-breaking surface, said outer hook surface having a concave frustoconical pitch extending radially inwardly from said cutting edge, the included angle between said frustoconical hook surface and said frustoconical margin surface being between about 80-89 degrees, and said chip-breaking surface having a concave frustoconical pitch extending radially inwardly from said outer hook surface at a further angle of between about 10-14 degrees, and
    an inner millet surface forming a fully closed monolithic center portion of said front face,
    said cutting tip having a rear mounting face adapted to be placed in abutting engagement with said front surface of said head portion of said shank, a projection extending centrally from said rear mounting face and registered within said depression in said front surface of said shank.

2. The stump cutter bit of claim 1, wherein said outer hook surface has a radial width of between about 2-8% of said cutting diameter.

3. The stump cutter bit of claim 1, wherein said outer hook surface has a radial width of between about 3-6% of said cutting diameter.

4. The stump cutter bit of claim 1, wherein said margin surface has a longitudinal width of between about 3-8% of said cutting diameter.

5. The stump cutter bit of claim 1, wherein said margin surface has a longitudinal width of between about 4-6% of said cutting diameter.

6. The stump cutter bit of claim 1, wherein said included angle between said frustoconical hook surface and said frustoconical margin surface is between about 83-86 degrees.

7. The stump cutter bit of claim 1, wherein said included angle between said frustoconical hook surface and said frustoconical margin surface is between 84-85 degrees.

8. The stump cutter bit of claim 1, wherein the frustoconical pitch of said chip-breaking surface extends radially inwardly from said outer hook surface at a further angle of between 11-13 degrees.

9. The stump cutter bit of claim 1, wherein the frustoconical pitch of said chip-breaking surface extends radially inwardly from said outer hook surface at a further angle of about 12 degrees.

10. The stump cutter bit of claim 1, wherein said inner gullet surface has a shallower concave pitch than the concave pitch of said chip-breaking surface.

11. A stump cutting wheel assembly of the type rotated at high speed to grind away an earthen-rooted tree stump, said cutter wheel assembly comprising:
    a cutter wheel body configured for power-driven rotation about a rotational axis thereof,
    a plurality of tool holders attached about the periphery of said cutter wheel body, each said tool holder extending longitudinally between opposing side surfaces thereof, each said tool holder including an aperture extending from one said side surface through to the other opposing side surface,
    a cutting tooth associated with each said tool holder, said cutting tooth including a shank extending along a longitudinal axis, said shank having a head portion located at one end thereof and screw threads at the other end thereof, the head portion including a front surface centered about and oriented generally perpendicular to said longitudinal axis, a depression formed in said front surface along said longitudinal axis,
    each said cutting tooth further including a generally circular cutting tip fixedly supported on each said head portion of the associated said shank, said cutting tip centered about said longitudinal axis, said cutting tip having a front face configured in use to be scraped across the wooden body of a tree stump generally along said longitudinal axis as said cutter wheel body is rotated about said rotational axis, an annular margin surface centered about said longitudinal axis and surrounding said front face, an annular cutting edge formed at an intersection between said margin surface and said front face, said cutting edge establishing a cutting diameter of said cutting tip,
    said front face including an outer annular hook surface and an intermediate annular chip-breaking surface, said outer hook surface having a concave frustoconical pitch extending radially inwardly from said cutting edge, said outer hook surface having a radial width of between about 2-8% of said cutting diameter, said margin surface having a longitudinal width of between about 3-8% of said cutting diameter, the included angle between said frustoconical hook surface and said frustoconical margin surface is between about 80-89 degrees, and said chip-breaking surface having a concave frustoconical pitch extending radially inwardly from said outer hook surface at a further angle of between about 10-14 degrees, an inner gullet surface forming a fully closed monolithic center portion of said front face, and said cutting tip having a rear mounting face adapted to be placed in abutting engagement with said front surface of said head portion of said shank, a projection extending centrally from said rear mounting face and registered within said depression in said front surface of said shank.

12. The cutter wheel assembly of claim 11, wherein said outer hook surface has a radial width of between about 2-8% of said cutting diameter.

13. The cutter wheel assembly of claim 11, wherein said outer hook surface has a radial width of between about 3-6% of said cutting diameter.

14. The cutter wheel assembly of claim 11, wherein said margin surface has a longitudinal width of between about 3-8% of said cutting diameter.

15. The cutter wheel assembly of claim 11, wherein said margin surface has a longitudinal width of between about 4-6% of said cutting diameter.

16. The cutter wheel assembly of claim 11, wherein said included angle between said frustoconical hook surface and said frustoconical margin surface is between about 83-86 degrees.

17. The cutter wheel assembly of claim 11, wherein said included angle between said frustoconical hook surface and said frustoconical margin surface is between 84-85 degrees.

18. The cutter wheel assembly of claim 11, wherein the frustoconical pitch of said chip-breaking surface extends radially inwardly from said outer hook surface at a further angle of between 11-13 degrees.

19. The cutter wheel assembly of claim 11, wherein the frustoconical pitch of said chip-breaking surface extends radially inwardly from said outer hook surface at a further angle of about 12 degrees.

20. The cutter wheel assembly of claim 11, wherein said inner gullet surface has a shallower concave pitch than the concave pitch of said chip-breaking surface.

* * * * *